United States Patent
Roberts

(10) Patent No.: US 12,236,125 B2
(45) Date of Patent: Feb. 25, 2025

(54) PERFORMANCE MONITORING FOR A MEMORY SYSTEM

(71) Applicant: Micron Technology, Inc., Boise, ID (US)

(72) Inventor: David Andrew Roberts, Wellesley, MA (US)

(73) Assignee: Micron Technology, Inc., Boise, ID (US)

( * ) Notice: Subject to any disclaimer, the term of this patent is extended or adjusted under 35 U.S.C. 154(b) by 92 days.

(21) Appl. No.: 17/661,244

(22) Filed: Apr. 28, 2022

(65) Prior Publication Data

US 2023/0350598 A1 Nov. 2, 2023

(51) Int. Cl.
*G06F 3/06* (2006.01)

(52) U.S. Cl.
CPC .......... *G06F 3/0653* (2013.01); *G06F 3/0604* (2013.01); *G06F 3/0659* (2013.01); *G06F 3/0679* (2013.01)

(58) Field of Classification Search
CPC .................................................. G06F 3/0653
USPC ......................................................... 711/127
See application file for complete search history.

(56) References Cited

U.S. PATENT DOCUMENTS

| | | | | |
|---|---|---|---|---|
| 8,874,835 B1* | 10/2014 | Davis | ..................... | G06F 3/0679 711/156 |
| 2005/0154838 A1* | 7/2005 | DeWitt, Jr. | ........... | G06F 9/3836 712/E9.035 |
| 2005/0155026 A1* | 7/2005 | DeWitt, Jr. | ........... | G06F 11/348 714/E11.2 |
| 2008/0189687 A1* | 8/2008 | Levine | ................. | G06F 11/3636 717/128 |
| 2008/0215863 A1* | 9/2008 | DeWitt | ............... | G06F 9/30181 712/E9.035 |
| 2009/0037382 A1* | 2/2009 | Ansari | ..................... | G06F 16/68 |
| 2014/0025877 A1* | 1/2014 | Talagala | ................ | G06F 3/0679 711/103 |
| 2014/0237157 A1* | 8/2014 | Takefman | ........... | G06F 12/0804 711/3 |
| 2014/0237205 A1* | 8/2014 | Takefman | ............. | G06F 3/0659 711/162 |
| 2015/0199268 A1* | 7/2015 | Davis | ................... | G06F 12/0246 711/103 |
| 2019/0026031 A1* | 1/2019 | Kachare | ................ | G06F 3/0611 |
| 2020/0183836 A1* | 6/2020 | Johns | ..................... | G06F 12/084 |
| 2021/0026837 A1* | 1/2021 | Talagala | .............. | G06F 16/2365 |
| 2021/0240627 A1* | 8/2021 | Jin | ........................ | G06F 11/076 |
| 2021/0382769 A1* | 12/2021 | Liang | ................... | G06F 11/0793 |

(Continued)

OTHER PUBLICATIONS

U.S. Appl. No. 63/233,051, by Brewer et al., filed Aug. 13, 2021 (xx pages).

(Continued)

*Primary Examiner* — Titus Wong
(74) *Attorney, Agent, or Firm* — Holland & Hart LLP

(57) ABSTRACT

Methods, systems, and devices for performance monitoring for a memory system are described. A memory system may use a set of counters to determine state information for the memory system. The memory system may also use a set of timers to determine latency information for the memory system. In response to a request for performance information, the memory system may transmit state information, latency information, or both to a host system.

21 Claims, 8 Drawing Sheets

(56) References Cited

U.S. PATENT DOCUMENTS

2022/0058132 A1* 2/2022 Roberts ............... G06F 12/0862
2022/0076733 A1* 3/2022 Yudanov ............. G06F 12/0875
2022/0113908 A1* 4/2022 Kim ..................... G06F 3/0659

OTHER PUBLICATIONS

U.S. Appl. No. 63/234,929, by Brewer et al., filed Aug. 19, 2021 (xx pages).
U.S. Appl. No. 63/309,392, by Hornung et al., filed Feb. 11, 2022 (xx pages).
"International Search Report and Written Opinion of the International Searching Authority," issued in connection with Int'l Appl. No. PCT/US23/62951, dated Jun. 8, 2023, 11 pages.

* cited by examiner

PERFORMANCE MONITORING FOR A MEMORY SYSTEM

FIELD OF TECHNOLOGY

The following relates to one or more systems for memory, including performance monitoring for a memory system.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read (e.g., sense, detect, retrieve, identify, determine, evaluate) a stored state in the memory device. To store information, a component may write (e.g., program, set, assign) the state in the memory device.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Some systems, such as near-data computing (NDC) systems, may include a memory system that is configured to perform various operations with and provide various services to a host system. For example, a memory system may include one or more memory devices for storing information for the host system and may include one or more logic circuits (which may be referred to as or may be examples of functions or compute functions) for performing operations, such as computations, for the host system. According to the techniques described herein, a memory system may collect performance information for the memory system so that a host system can use the performance information to improve system performance. For example, the memory system may collect state information (which may provide insight into various states of one or more memories), or latency information (which may provide information about the latency among other aspects of various operations), or other information, or some combination thereof. The performance information collected by the memory system will also enable improved debugging of the memory system, improved performance tuning of the memory system, or improved modeling of the memory system, or any combination thereof, among other advantages.

Features of the disclosure are initially described in the context of a system and a memory system as described with reference to FIGS. 1 and 2. Features of the disclosure are described in the context of process flows as described with reference to FIGS. 3-5. These and other features of the disclosure are further illustrated by and described with reference to an apparatus diagram and flowcharts that relate to performance monitoring for a memory system as described with reference to FIGS. 6-8.

Figure 1:
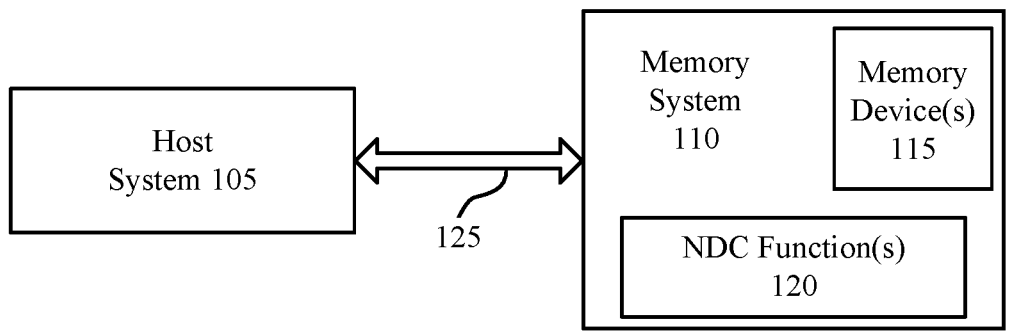
FIG. 1 illustrates an example of a system that supports performance monitoring for memory in accordance with examples as disclosed herein.

FIG. 1 illustrates an example of a system 100 that supports performance monitoring in accordance with examples as disclosed herein. The system 100 may include a host system 105 and a memory system 110. The host system 105 may interact with (e.g., communicate with, control) the memory system 110 as well as other components of the electronic device that includes the memory system 110. In some examples, the host system 105 and the memory system 110 may interact over the interface 125, which may be an example of a Compute Express Link (CXL) interface, Gen-Z interface, OpenCAPI interface, or other type of interface. For example, commands and data may be communicated between the host system 105 and the memory system 110 via the interface 125.

In some examples, the system 100 may be included in, or coupled with, an electronic device (e.g., a computing device, a mobile computing device, a wireless device, a communication device). The electronic device may be a portable electronic device. For example, the electronic device may be a computer, a laptop computer, a tablet computer, a smartphone, a cellular phone, a wearable device, an internet-connected device, or the like. The host system 105 may be or include a system-on-a chip (SoC), a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components. In some examples, the host system 105 may be referred to as a host, a host device, or other suitable terminology.

The memory system 110 may store information for the host system 105 and may perform various processing tasks (e.g., various computations) for the host system 105. For example, in response to instructions from the host system 105 to perform a computation, the memory system 110 may retrieve (e.g., from a memory device 115) the data for the computation, perform the computation (e.g., using an NDC function 120) and transmit the results of the computation to the host system 105. Thus, the host system 105 may offload various processing tasks to the memory system 110, which may reduce the latency and bandwidth issues that arise in other systems that transfer data from the memory system 110 to the host system 105 for computations at the host system 105.

The memory system 110 may include one or more memory device(s) 115, which may be configured to store information from and for the host system 105. The memory device(s) 115 may be of the same type of memory or of different types of memories (e.g., NAND memory, phase change memory, DRAM, FeRAM, SRAM) and may be coupled with the NDC function(s) 120 so that data stored at the memory devices(s) 115 can be operated on by the NDC function(s) 120. The NDC function(s) 120 may be logic circuits that are configured to perform computations and other processing operations on data from the memory device (s) 115, data from the host system 105, or both. So, the host system 105 may offload processing tasks (e.g., for one or more applications) to the memory system 110, which may use the NDC function(s) 120 to perform the processing tasks locally before returning associated output data to the host system 105. In some examples, an NDC function may also be referred to as a near-memory compute (NMC) function or other suitable terminology.

In some examples, the host system 105 may include a processor and one or more cache memories coupled with the processor. The host system 105 may also include an operating system that interfaces with hardware (such as the processor) of the host system 105 and that is configured to provide one or more application programming interfaces for applications to interface with the hardware. An application may perform one more functions using the hardware and resources provided by the operating system. In some examples, the host system 105 may task the memory system 110 with performing various computations for the application(s).

The host system 105 may transmit access commands to instruct the memory system 110 to perform access operations on the memory device(s) 115. For example, the host system 105 may use write commands to instruct the memory system 110 to write data to the memory device(s) 115 and may use read commands to instruct the memory system 110 to read data from the memory device(s) 115. In response to the access commands from the host system 105, which may be referred to as external access commands, the memory system 110 may generate corresponding access commands for the memory device(s) 115, which may be referred to as internal access commands. The host system 105 may also issue other types of commands that instruct the memory system 110 to perform various operations (e.g., processing tasks, computations) other than memory operations.

In addition to receiving commands from the host system 105, the memory system 110 may also issue requests to the host system 105. For example, the memory system 110 may transmit read requests to the host system 105 to request that the host system 105 send to the memory system 110 specific data from the cache memory(s) at the host system 105. As another example, the memory system 110 may transmit recall requests to the host system 105 to request that the host system 105 flush data in one or more of the cache memories at the host system 105. Flushing data from a cache memory may refer to communicating the data in the cache memory to the memory system 110. The memory system 110 may transmit a recall request, for example, if the memory system 110 is creating a backup copy of data in a memory device 115 but some of the data in the memory device 115 is out-of-date with respect to corresponding data in the cache memory(s) of the host system 105. In such a scenario, the memory system 110 may replace the out-of-date data with updated data by either A) specifically requesting (e.g., via a read request) the up-to-date data or B) requesting all the data (e.g., via a recall request) in the cache memory(s). A recall request may also be referred to as an eviction request, a recall command, or other suitable terminology.

To facilitate memory access operations, the memory system 110 may store metadata for the memory device(s) 115. For example, the memory system 110 may store metadata on a per-region basis, where a region refers to a set or range of memory cells. In some examples, a region may refer to one or more cache lines of a memory device 115. In some examples, the memory cells in a region may have contiguous addresses and may store data for the NDC function(s) 120 (e.g., the memory cells in the region may be subject to NDC function(s) 120). In addition to metadata that facilitates memory access operations, the memory system 110 may store metadata that reflects various characteristics associated with the data stored in a region.

The host system 105 may initiate memory access operations at the memory system 110 as well as computational operations. For example, the host system 105 may initiate memory access operations that are performed by the memory device(s) 115 and may initiate computational operations that are performed by the NDC function(s) 120. However, the internal workings of the memory system 110 may be hidden from the host system 105. Thus, the host system 105 may be unable to accurately determine various aspects of the performance of the memory system 110, which in turn may prevent the host system 105 from optimizing or improving operations. The opaque nature of the memory system 110 may also inhibit designers, modelers, and test engineers from accurately characterizing the performance of the memory system 110.

According to the techniques described herein, the memory system 110 may collect and transmit performance information that provides insight into various aspects of performance otherwise hidden from external entities. For example, the memory system 110 may collect metadata state information, which may provide insight into various states of the memory device(s) 115, and/or latency information, which may provide insight into the latency of various operations.

Figure 2:
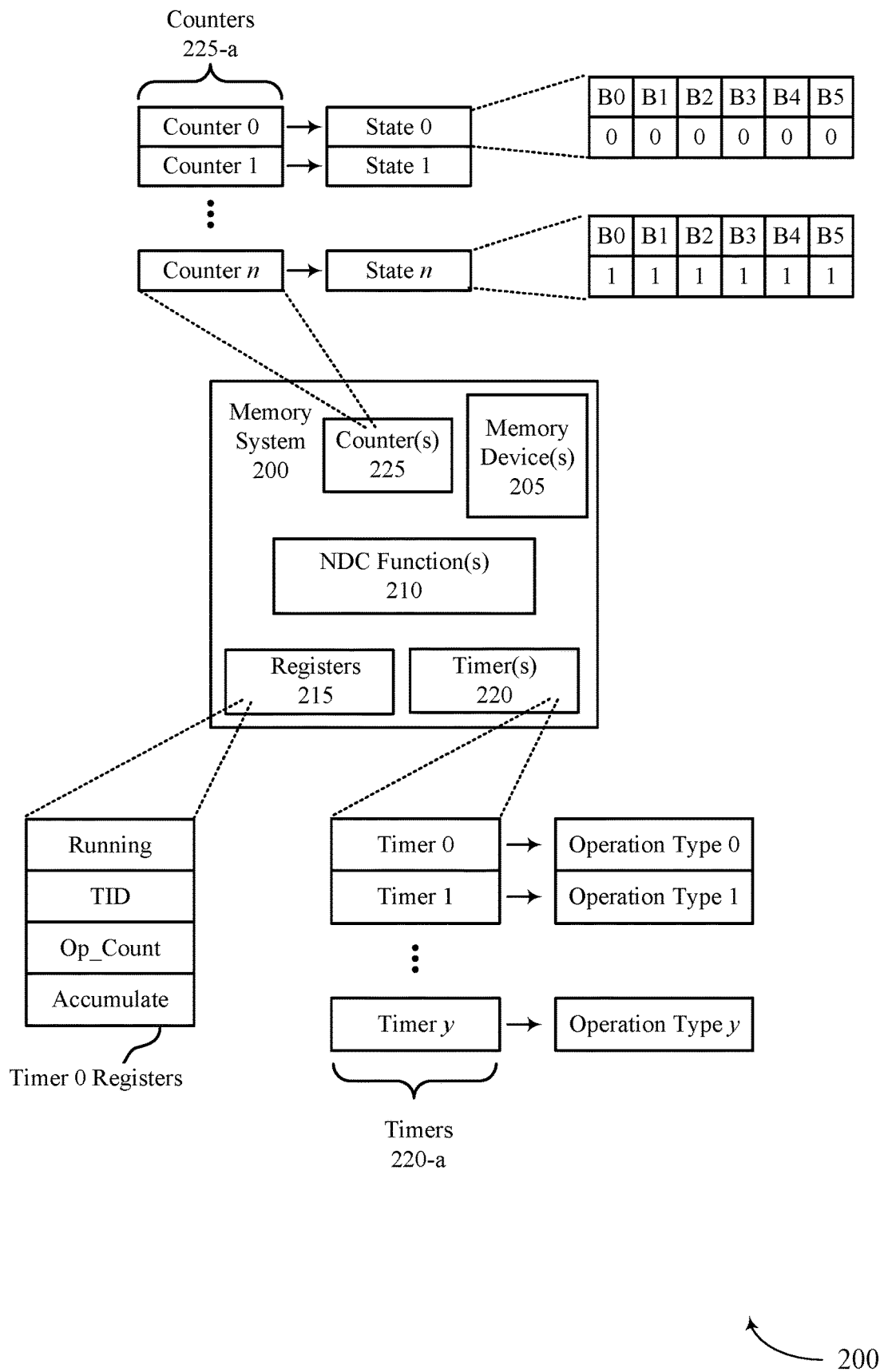
FIG. 2 illustrates an example of a memory system that supports performance monitoring in accordance with examples as disclosed herein.

FIG. 2 illustrates an example of a memory system 200 that supports performance monitoring in accordance with examples as disclosed herein. The memory system 200 may be an example of a memory system 110 as described with reference to FIG. 1. The memory system 200 may include one or more memory device(s) 205, one or more NDC function(s) 210, one or more registers 215, and one or more timer(s) 220. The memory system 200 may collect performance information, such as state information and latency information, that a host system (or other entity) can use to characterize the performance of the memory system 200.

The NDC function(s) 210 may be configured to perform computations for or related to a host system. The data operated on by the NDC function(s) 210 may be data retrieved from the memory device(s) 205, data received from the host system, or both. Upon completion of a computation by an NDC function 210, the memory system 200 may communicate the results of the computation to the host system, may store the results of the computation in the memory device(s) 205, or both. So, operation of the NDC function(s) 210 may involve accessing the memory device(s) 205. According to the techniques described herein, the memory system 200 may track state information for the memory device(s) 205, which may help a host system, or other entity, system, or device, characterize the performance of the memory system 200 when operations at the NDC function(s) 210 and the memory device(s) are invoked.

In addition to storing data for the host system, the memory system 200 may also store metadata that is associated with the data. For example, the memory system 200 may store data for the host system 105 and metadata associated with the data in the memory device(s) 205. The memory system 200 may store metadata for data on a per-region basis or at a different level of granularity. The metadata for a region may include x (e.g., six) bits, and each combination of the x bits may represent a metadata state for the region, which may indicate various attributes of the region. For example, given x bits (e.g., six bits) of metadata for a region, there may be $2^x$ metadata states (e.g., $2^6$=64 metadata states) for the region. So, there may be n metadata states for a region, where n is equal to $2^x$. However, other quantities of metadata bits and metadata states are contemplated and within the scope of the present disclosure.

The memory system 200 may include and maintain a set of counters 225 for each region, or at least one region, of the memory device(s) 205. Within a set of counters for a region, such as the counters 225-a, each counter may correspond to a different metadata state of the region. For example, for a given region of a memory device 205, the memory system 200 may maintain counter 0 through counter n, where counter 0 corresponds to metadata state 0, counter 1 corresponds to metadata state 1, and so on and so forth. If there are x=6 bits of metadata for the region, metadata state 0 may correspond to each bit of the metadata (e.g., bit 0 (B0) though bit 5 (B5)) being a zero. As another example, metadata state n may correspond to each bit of the metadata (e.g., bit 0 (B0) though bit 5 (B5)) being a one. The counters 225 may be included in the memory device(s) 205 or in the registers 215.

The counters, as one example, may allow the memory system 200 to track metadata state information for the memory device(s) 205. Upon receipt of an access command (e.g., a read command, a write command) or other type of command (e.g., a command that invokes an NDC function 210), the memory system 200 may determine the region targeted by the access command (e.g., based on the address indicated by the access command). The memory system 200 may then determine the metadata state for that region and set (e.g., increment) the counter corresponding to that metadata state. For example, if the metadata state for the region is state n, the memory system 200 may increment the value of counter n. Thus, the memory system 200 may track the quantity of commands received for the region with the metadata in various states, which in turn may allow the memory system 200 to determine the number of each type of state transition for various invocations of an NDC function 210.

The memory system 200 may clear or set a value of (e.g., reset to a default value, such as zero) counters on a schedule, such as periodically, or in response to a condition such as a prompt (e.g., from the host system). For example, the memory system 200 may include a control register for resetting the counters 225 that is writable by the host system. In some examples, the counters 225 and the control register are mapped as Control and Status Registers (CSRs) in the physical address space of the host system.

In some examples, the metadata bits may include one or more bits that indicate the type of command received for the region. For example, the B0 bit may indicate whether the access command received for the region is a read command (e.g., B0=0) or a write command (e.g., B0=1). So, the memory system 200 may use the counters 225 track the quantity of commands of a given type received for the region with the metadata in various states. In some examples, the metadata bits may include one or more bits that indicate error information for the region. For example, the B1 bit may indicate whether the data stored in the region has one or more errors.

In some examples, the metadata bits may represent information that helps the memory system 200 create and maintain a backup copy of the data in a region, which may be useful in recovering from an unexpected power loss. For instance, the metadata bits may include one or more bits that indicate whether the host system has a copy of the data stored the region. To illustrate, if data set A is stored in the region, the B2 bit may indicate whether the host system has a copy (e.g., a writable copy) of data set A. As another example, the metadata bits may include one or more bits (e.g., the B3 bit) that indicate whether the region is currently involved in an operation, such as an "undo" operation for restoring previously stored data to the region (e.g., data stored in the region before a power loss). As another example, the metadata bits may include one or more bits (e.g., the B4 bit) that indicate whether the region has been written to since the operation (e.g., the "undo" operation) began. As another example, the metadata bits may include one or more bits (e.g., the B5 bit) that indicate a location of the previously stored data. Although described with reference to various types of metadata bits, other types of metadata bits may be used as the basis for the counters.

In addition to or alternative to determining state information for a region, the memory system 200 may determine latency information, among other parameters, for one or more operations.

To determine latency information for operations, the memory system 200 may include and maintain a set of timers 220. Within a set of timers, such as the timers 220-a, each timer may correspond to a different type of operation. For example, the memory system 200 may maintain timer 0 through timer y, where timer 0 corresponds to a first type of operation (e.g., operation type 0), timer 1 corresponds to a second type of operation (e.g., operation type 1), and so on and so forth. In some examples, the timers 220 may be included in the registers 215.

Each timer may have one or more associated registers that allow the memory system 200 to maintain (e.g., start, stop, reset) the timer and to determine latency information for the type of operation associated with the timer. For example, timer 0 may have an associated Running register that indicates whether timer 0 is running. Additionally or alternatively, timer 0 may have an associated transaction identifier (TID) register that indicates the transaction identifier for the operation being timed. Additionally or alternatively, Timer 0 may have an associated Operation Count register that indicates the quantity of operations of a given type have been timed. Additionally or alternatively, Timer 0 may have an associated Accumulate register that indicates the cumulative latency for the operations of a given type that have been timed. For example, the Accumulate register may indicate the cumulative latency for the quantity of operations indicated by the Operation Count register.

The memory system 200 may use the timers 220 and associated registers 215 to determine latency information for different types of operations. For example, the memory system 200 may use a timer and associated registers to determine the latency (e.g., the round-trip latency) of a memory read operation. The latency of a memory read operation may be, for example, the time between receipt of a read command from the host system and receipt of a response from a memory device 205 indicating completion of the read operation. In some examples, the response from the memory device 205 (e.g., indicating completion of the read operation) may be the data from the read operation. However, other end points for the latency of a read operation are contemplated and within the scope of the present disclosure.

In another example, the memory system 200 may use a timer and associated registers to determine the latency (e.g., the round-trip latency) of a memory write operation. The latency of a memory write operation may be, for example, the time between receipt of a write command from the host system and receipt of a response from a memory device 205 indicating completion of the write operation. However, other end points for the latency of a write operation are contemplated and within the scope of the present disclosure.

In another example, the memory system 200 may use a timer and associated registers to determine the latency (e.g., the round-trip latency) of a recall operation. The latency of a recall operation may be, for example, the time between receipt of a recall command from a memory device 205 and receipt of a response from the host system indicating completion of the recall operation. However, other end points for the latency of a recall operation are contemplated and within the scope of the present disclosure.

An example with reference to timer 0 is now described. For ease of illustration, the type of operation corresponding to timer 0 is referred to as operation type A.

Initially, the Running register for timer 0 may be set to a value (e.g., zero) that indicates timer 0 is not running. Upon receipt of a command for operation type A, the memory system 200 may start timer 0 and set the Running register to a value (e.g., one) that indicates timer 0 is running. The memory system 200 may also set the TID register to a value that indicates the transaction identifier for the command, which may allow the memory system 200 to determine if a received response is for the operation being timed or for a different operation. In some examples, the transaction identifier may be the address of the region targeted for the operation.

Upon receipt of a response indicating that the initiated operation has been completed, the memory system 200 may stop timer 0, add the time from timer 0 to the value in the Accumulate register, and reset timer 0. The memory system 200 may also set (e.g., increment) the value of the Operation Counter register to indicate the total quantity of operations corresponding to the Accumulate register.

The memory system 200 may clear (e.g., reset to a default vale, such as zero) the registers 215 periodically or in response to a prompt (e.g., from the host system). For example, the memory system 200 may include a control register for resetting the registers 215 that is writable by the host system.

In some examples, the memory system 200 may maintain the timers 220 (and associated registers) on a state-basis so that the memory system 200 can determine the latency of operations associated with different metadata states. For example, the timers 220-*a* for a type of operation may correspond to metadata state 0, whereas a different set of timers 220 for the type of operation may correspond to metadata state 1, and so on and so forth. Thus, the memory system 200 may determine how the latency for a type of operation (e.g., a write operation, a read operation, a recall operation) varies with the metadata state of the region associated with the operation.

In some examples, the memory system 200 may select a subset of the metadata states for which to maintain timers, which may reduce resource consumption associated with maintaining the counters. For example, the memory system 200 may determine the z (e.g., ten) most frequent metadata states and maintain timers for those z metadata states but not the other (e.g., less frequent) metadata states. As an illustration for two states of metadata, if the memory system 200 determines that a first quantity of access commands received for the range (e.g., set of memory cells) and associated with a first metadata state is greater than a second quantity of access commands received for the range and associated with a second metadata state, the memory system 200 may determine the latency for operations associated with the first state (based on the first quantity of access commands being greater than the second quantity of access commands).

In some examples, the memory system 200 may use state information and latency information to determine the average latency for transactions that involve multiple operations. For example, to complete a transaction of type T the memory system 200 may perform a quantity of operations each of which has state information and latency information. To determine the average latency ($L_{Avg}$) for a transaction of type T, the memory system 200 may calculate $$L_{Avg} = \frac{\sum_{0}^{i-1}(\text{Op\_Count} \times L)}{\sum_{0}^{i-1}\text{Op\_Count}},$$

where i is the quantity of operations implicated by the transaction, Op_Count is the value of the Operation Count registers for the operations implicated by the transactions, and L is the latency for the operations implicated by the transaction. The latency L for an operation may be a default value for the operation or the value of the Accumulate registers for the operation. In some examples, the latencies used to calculate $L_{Avg}$ may be state-specific latencies, which may increase accuracy. Determining the average latency for transactions may allow a host system (or other entity) to more accurately forecast performance of the memory system 200 relative to other techniques (e.g., techniques that rely exclusively on default latencies, which may be inaccurate, variable, or unknown for certain operations).

The memory system 200 may according to a timing, such as periodically, or in response to a prompt (e.g., from the host system), store the values of the timers 220 and the counters 225 in one or more registers, local memory arrays, latches, or memory device(s) 205. In response to a request for performance information, the memory system 200 may read the stored values of the timers 220 and the counters 225, and transmit performance information that is based on the stored values. For example, the memory system 200 may transmit state information that is based on the values of the counters 225. Additionally or alternatively, the memory system 200 may transmit latency information that is based on the values of the timers 220, the values of the registers 215, or both.

In some examples, the memory system 200 may transmit state information that indicates the frequency of the metadata states associated with the counters. Additionally or alternatively, the memory system 200 may transmit state information that indicates the z most frequent metadata states, the z least frequent metadata states, or both. In some examples, the memory system 200 may transmit latency information that indicates the average latency for one or more types of operations. For example, for operation type x, the memory system 200 may indicate the average latency for operation type x. In some examples (e.g., in scenarios in which the memory system 200 track latency on a state-basis), the memory system 200 transmit the state-specific average latency for an operation. For instance, the memory system 200 may transmit latency information that indicates the average latency for operation type x associated with state y as well as the average latency for the type of operation associated with state w.

Thus, the memory system 200 may collect performance information, such as state information and latency information, that the host system (or other entity) can use to characterize the performance of the memory system 200.

Figure 3:
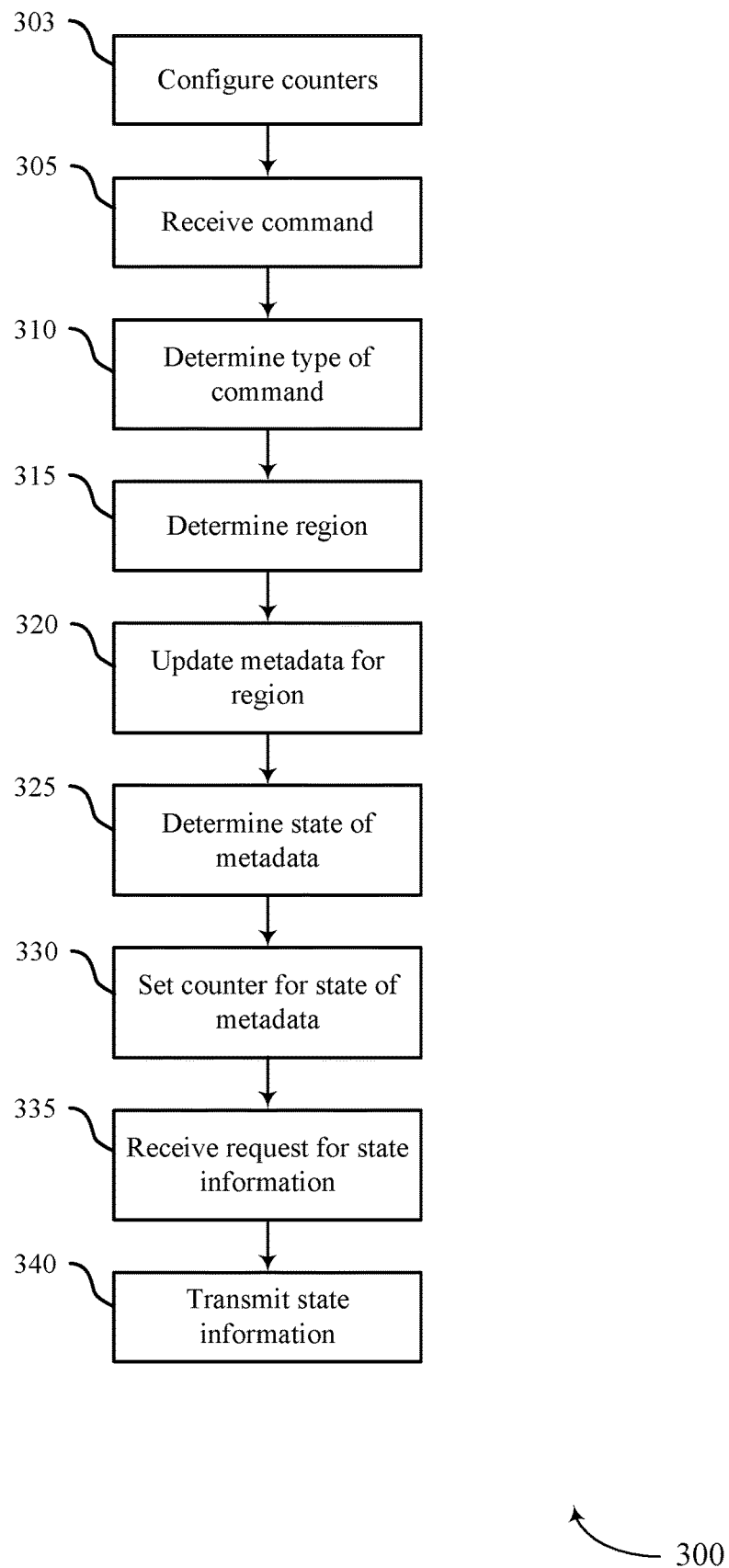
FIG. 3 illustrates an example of a process flow that supports performance monitoring for a memory system in accordance with examples as disclosed herein.

FIG. 3 illustrates an example of a process flow 300 that supports performance monitoring for a memory system in accordance with examples as disclosed herein. The process flow 300 may be implemented by a memory system as described herein. For example, the process flow 300 may be implemented by a memory system 110 as described with reference to FIG. 1 or by a memory system 200 as described with reference to FIG. 2. By implementing the process flow 300, the memory system may determine state information that a host system (or other entity) can use to characterize the performance of the memory system.

At 303, the memory system may configure a set of counters for state information. For example, the memory system may configure the counters 225. Configuring a counter may refer to initializing the counter (e.g., setting the counter to a value, such as an initial value or a default value), assigning the counter to a region, or assigning the counter an associated metadata state, other operations, or any combination thereof. So, each counter of the set of counters may be associated with a region as well as a respective state of the metadata for the region.

At 305, the memory system may receive a command for a set of memory cells in a region of a memory device included in the memory system. For example, the memory system may receive (e.g., from a host system) an access command (e.g., a read command for a region, a write command for a region) or another type of command (e.g., a command that invokes an NDC function). At 310, the memory system may determine a type of the command. For example, the memory system may determine whether the command is a read command, a write command, or another type of command.

At 315, the memory system may determine the region (e.g., set of cells) of a memory device that is associated with the command. For example, if the command is an access command, the memory system may determine the region corresponding to an address indicated by the access command. If the command is a different type of command (e.g., other than an access command), the memory system may determine the region of a memory device that is implicated in performance of the operation associated with the command. For example, if the command is a compute command for a set of data stored in a memory device, the memory system may determine the region of the memory device that stores the set of data.

At 320, the memory system may update the metadata for the region to reflect the type of command received from the region. At 325, the memory system may determine the state of the metadata for the region. At 330, the memory system may set the counter (for the region) that corresponds to the state of the metadata. For example, the memory system may increment the value of the counter. The memory system may increment the value of the counter based on the metadata state for the region matching (e.g., being equal to) the metadata state associated with the counter.

At 335, the memory system may receive a request for performance information. For example, the memory system may receive from the host system a request for state information. At 340, the memory system may transmit performance information based on (e.g., in response to) the request received at 335. For example, the memory system may transmit to the host system state information that is based on the value of the counter. The state information may also be based on the values of other counters in the set of counters for region, the values of counters for other regions, or both.

Various operations of the process flow 300 may repeat or cycle. For example, the memory system may implement at least some if not all of the operations between 305 and 330 (inclusive) for a second command for the region. In such a scenario, the memory system may receive a second command for the set of memory cells in the region. The memory system may determine the type of the second command and may determine the region targeted by the second command. The memory system may also update the metadata for the region (e.g., to reflect the type of the second command). The memory system may then determine the state of the metadata (which may be a second state different than the state determined at 325) for the region and set (e.g. increment) the counter that corresponds to the state of the metadata. The counter may the same counter incremented at 330 (e.g., if the state of the metadata is the same) or may be a different counter for the region (e.g., if the state of the metadata is different). In such a scenario, the state information transmitted at 340 may be based on the value for the different counter.

Additionally or alternatively, the memory system may implement at least some if not all of the operations between 305 and 330 (inclusive) for a command for a second region. In such a scenario, the memory system may receive a second command for a second set of memory cells in second region. The memory system may determine the type of the second command and may determine the second region targeted by the second command. The memory system may also update the metadata for the second region (e.g., to reflect the type of the second command). The memory system may then determine the state of the metadata for the second region and set (e.g. increment) the counter that corresponds to the state of the second metadata. The counter may be a different counter than the counter set at 330 (e.g., because the second command is for a different region than the command received at 305). In such a scenario, the state information transmitted at 340 may be based on the value for the different counter.

Thus, the memory system may determine state information that a host system (or other entity) can use to characterize the performance of the memory system. Alternative examples of the foregoing may be implemented, where some operations are performed in a different order than described, are performed in parallel, or are not performed at all. In some cases, operations may include additional features not mentioned herein, or further operations may be added. As mentioned, certain operations may be performed multiple times or certain combinations of operations may repeat or cycle.

Figure 4:
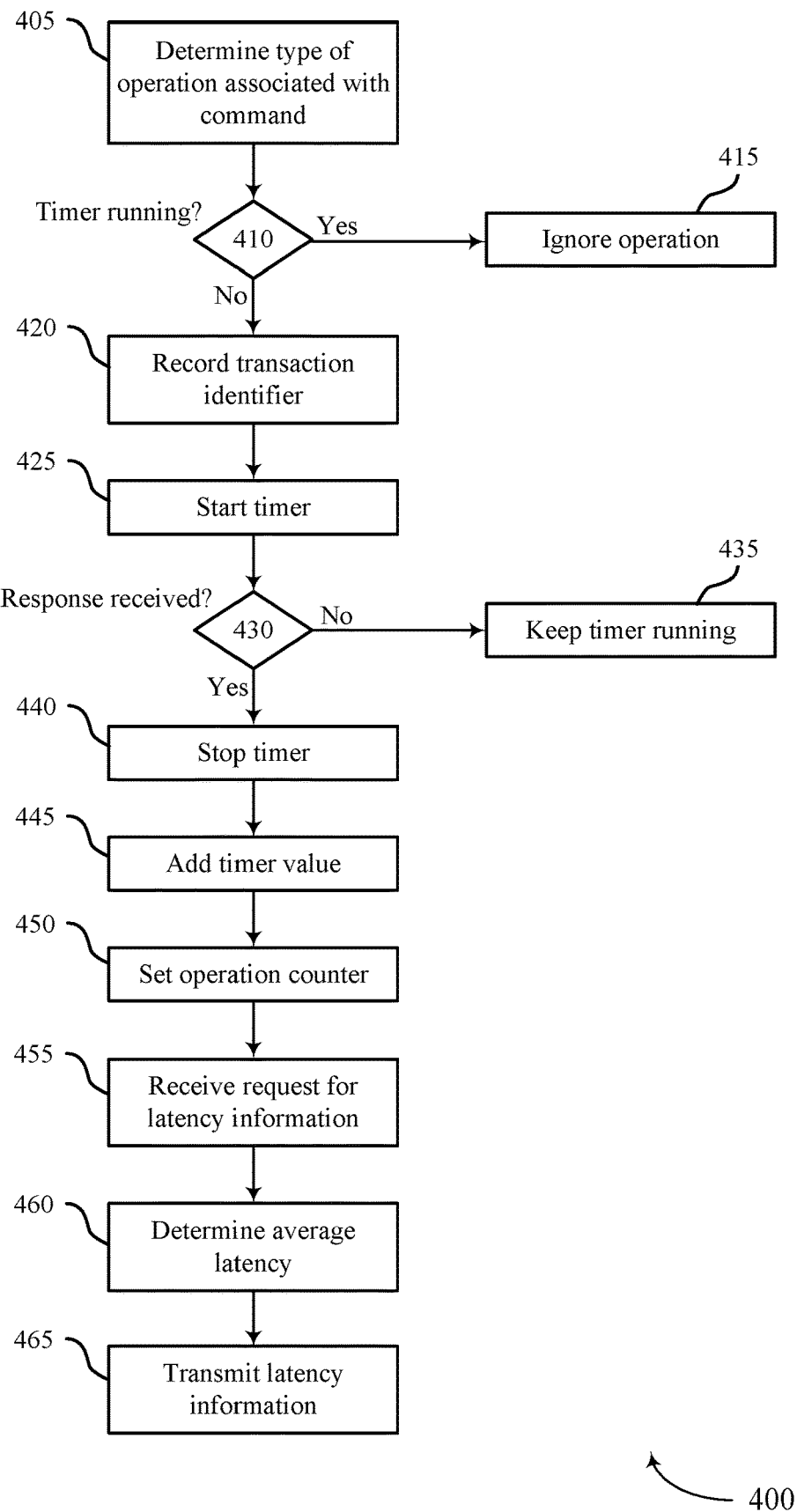
FIG. 4 illustrates an example of a process flow that supports performance monitoring for a memory system in accordance with examples as disclosed herein.

FIG. 4 illustrates an example of a process flow 400 that supports performance monitoring for a memory system in accordance with examples as disclosed herein. The process flow 400 may be implemented by a memory system as described herein. For example, the process flow 400 may be implemented by a memory system 110 as described with reference to FIG. 1 or by a memory system 200 as described with reference to FIG. 2. By implementing the process flow 400, the memory system may determine latency information that a host system (or other entity) can use to characterize the performance of the memory system.

At 405, the memory system may determine a type of operation associated with a command. The command may be an access command (e.g., a read command, a write command) or another type of command (e.g., a recall command, a compute command that invokes an NDC function). The command may be a command received by the memory system from the host system (e.g., a read command, a write command), may be a command received by the memory system from a memory device of the memory system (e.g., a recall command, a compute command), or may be a command generated and transmitted by a controller of the memory system.

At 410, the memory system may determine whether the timer associated with the type of operation is already running. To make this determination, the memory system may check the value of Running register associated with the type of operation. If, at 410, the memory system determines that the timer associated with the type of operation is already running (e.g., for another operation of the type), the memory system may proceed to 415 and ignore the operation (e.g., keep the timer running for the other operation). If, at 410, the memory system determines that the timer associated with the type of operation is not running, the memory system may proceed to 420 and record the transaction identifier for the command. For example, the memory system may store the transaction identifier in the TID register associated with the timer.

At 425, the memory system may start the timer associated with the type of operation. The memory system may start the timer based on (e.g., in response to) the determination at 410 that the timer is not already running (e.g., actively tracking the latency of another operation). The memory system may start the timer based on (e.g., in response to) receipt or transmission of the command.

At 430, the memory system may determine whether a response indicating completion of the operation has been received. To make this determination, the memory system may check received responses for the transaction identifier recorded at 420. The responses may be received from the host system or a memory device of the memory system. If a received response indicates the transaction identifier recorded at 420, the memory system may identify the response as the response for the operation being tracked by the timer. If a response indication a transaction identifier other than the transaction identifier recorded at 420, the memory system may identify the response as a response for an operation other than the operation being tracked by the timer.

If, at 430, the memory system determines that a response indicating completion of the operation has not been received, the memory system may proceed to 435 and keep the timer for the operation running. If, at 430, the memory system determines that a response indicating completion of the operation has been received, the memory system may proceed to 440 and stop the timer for the operation. So, memory system may stop the timer based on (e.g., in response to) receipt of the response for the operation.

At 445, the memory system may add the value of the timer, which may represent the latency of the operation, to the value in the Accumulate register (which may represent the cumulative latency for previous operations of the type). In some examples, the memory system may separately record the latency of the individual operation for later use. The memory system may also reset the timer to prepare for another operation.

At 450, the memory system may set (e.g., increment) the operation counter register associated with the timer. The memory system may increment the operation counter based on (e.g., in response to) adding the value of the timer to the Accumulate register. Thus, the memory system may update the quantity of operations associated with the Accumulate register.

At 455, the memory system may receive a request for performance information. For example, the memory system may receive from the host system a request for latency information. At 460, the memory system may determine the average latency for the type of operation. In some examples, the memory system may determine the average latency for the type of operation as the quotient of the cumulative latency indicated by the Accumulate register divided by the quantity of operations indicated by the Operation Counter register.

At 465, the memory system may transmit latency information based on (e.g., in response to) the request received at 455. For example, the memory system may transmit to the host system latency information that is based on the value of the timer. In some examples, the memory system may transmit the average latency for the type of operation determined at 460. The latency information may also be based on the values of other timers for other types of operations or associated with other states. For example, the latency information may indicate one or more latencies (e.g., average latencies) for other types of operations, one or more state-specific latencies (e.g., state-specific average latencies) for the type of operation, or both, among other latencies.

Various operations of the process flow 400 may repeat or cycle. For example, the memory system may implement at least some if not all of the operations between 405 and 450 (inclusive) for a second command. In such a scenario, the memory system receive a second command of the type and start the timer associated with the type of command. The memory system may stop the timer if a response for the operation is received, add the value of the timer to Accumulate register for the type of operation, and reset the timer. In determining the average latency for the type of operation, the memory system may determine the average latency based on the second latency for the second command of the type.

Additionally or alternatively, the memory system may implement at least some if not all of the operations between 405 and 450 (inclusive) for a second access command for a second type of operation. In such a scenario, the memory system may receive the second command of the type and start a second timer associated with the second type of command. The memory system may stop the second timer if a response for the operation is received, add the value of the timer to Accumulate register for the second type of operation, and reset the second timer. In determining the average latency for the second type of operation, the memory system may determine the average latency based on the second latency for the second command of the type.

Thus, the memory system may determine latency information that a host system (or other entity) can use to characterize the performance of the memory system. Alternative examples of the foregoing may be implemented, where some operations are performed in a different order than described, are performed in parallel, or are not performed at all. In some cases, operations may include additional features not mentioned herein, or further operations may be added. As mentioned, certain operations may be performed multiple times or certain combinations of operations may repeat or cycle.

Figure 5:
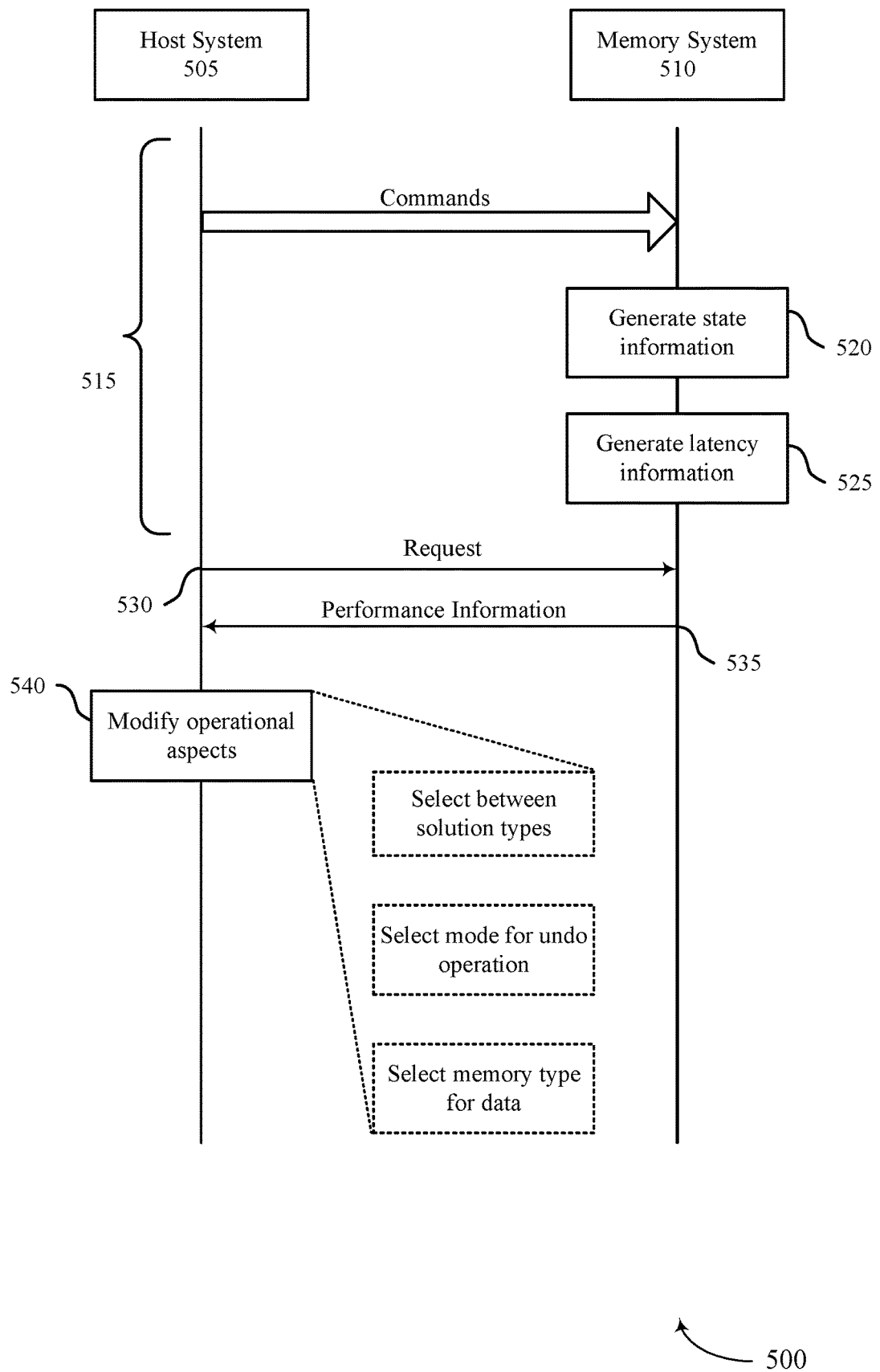
FIG. 5 illustrates an example of a process flow that supports performance monitoring for a memory system in accordance with examples as disclosed herein.

FIG. 5 illustrates an example of a process flow 500 that supports performance monitoring for a memory system in accordance with examples as disclosed herein. The process flow 500 may be implemented by a host system and a memory system as described herein. By implementing the process flow 500, a system may determine and use performance information to characterize and improve the performance of the memory system.

During 515, the host system 505 may transmit one or more commands to the memory system 510. For example, the host system 505 may transmit one or more access commands (e.g., read commands, write commands), one or more commands for the memory system 510 to perform one or more computations, or both. The memory system 510 may receive the commands and perform operations (e.g., read operations, write operations, recall operations, computations) associated with the commands.

At 520, the memory system 510 may generate state information for the memory system. For example, the memory system 510 may generate metadata state information for one or more regions of one or more memory device(s) in the memory system. The memory system 510 may generate the state information based on the commands received from host system 505 as described herein and with reference to FIG. 3. At 525, the memory system 510 may generate latency information for the memory system. For example, the memory system 510 may generate latency information for one or more operations. The memory system 510 may generate the latency information for operations associated with commands received from host system 505, commands transmitted to the host system 505, or both, as described herein and with reference to FIG. 4. At various points in time, the memory system 510 may store the performance information (e.g., state information, latency information) in one or more memories or register of the memory system.

At 530, the host system 505 may transmit a request for performance information to the memory system 510. For example, the host system 505 may transmit a request for state information, latency information, or both. At 535, the memory system 510 may transmit performance information to the host system 505. For example, the memory system 510 may transmit state information, latency information, or both. The memory system 510 may transmit the performance information based (e.g., in response to) the request received at 530.

At 540, the host system 505 may use the performance information as a basis to modify one or more operational aspects of the system or the memory system 510.

In one example, the host system 505 may use the performance information to select between a software solution and a hardware solution (or some combination of both) for one or more computations. In some examples, the host system 505 may include a software application that is capable of providing the same or similar functionality as the NDC functions of the memory system 510. In such examples, the host system 505 may use the performance information to select between the software application and the NDC function for performing one or more computations. For instance, the host system 505 may compare the latency information from the memory system 510 with latency information from the software applications and select the solution with the lowest latency for the one or more computations. Framed another way, the host system 505 may select between devices (e.g., the host system 505 and the memory system 510) for performance of a computation.

In another example, the host system 505 may use the performance information as a basis to select a mode for undo operations by the memory system 510. For example, the host system 505 may use state information, latency information, or both to select between 1) a first mode in which the memory system 510 updates out-of-date data in a memory device by transmitting a read command for corresponding up-to-date data in a cache memory of the host system and 2) a second mode which the memory system 510 updates out-of-date data in a memory device by transmitting a recall command for all the data in a cache memory of the host system.

In another example, the host system 505 may use the performance information as a basis to (e.g., as an input to) select a type of memory for storing data. For example, the host system 505 may use state information, latency information, or both to select between different types of memory at the memory system 510 for storing a particular set of data or a particular type of data. To illustrate, if the memory system includes a first type of memory and a second type of memory, the memory system may select for storing a set of data (or a type of data) the type of memory that enters a particular set of states less frequently than the other type of memory.

Thus, a system may determine and use performance information to characterize and improve the performance of the memory system. Although described with reference to various examples, the use of the performance information is not limited to these examples and may be used to improve various other aspects of the performance of the system. Additionally, the performance information may be used by entities other than a host system. For instance, the performance information described herein may be used by engineers for improved debugging, improved performance tuning, and/or improved modeling of the memory system, among other advantages.

Alternative examples of the foregoing may be implemented, where some operations are performed in a different order than described, are performed in parallel, or are not performed at all. In some cases, operations may include additional features not mentioned herein, or further operations may be added. Additionally, certain operations may be performed multiple times or certain combinations of operations may repeat or cycle.

Figure 6:
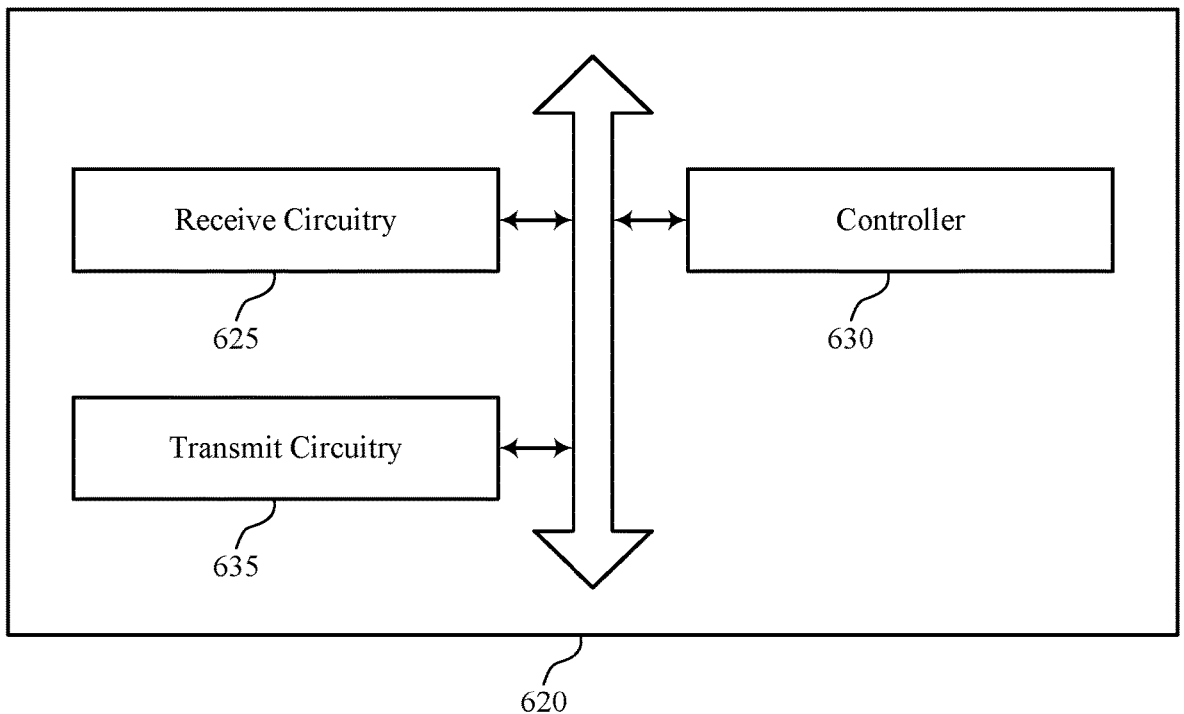
FIG. 6 shows a block diagram of a memory system that supports performance monitoring for a memory system in accordance with examples as disclosed herein.

FIG. 6 shows a block diagram 600 of a memory system 620 that supports performance monitoring for a memory system in accordance with examples as disclosed herein. The memory system 620 may be an example of aspects of a memory system as described with reference to FIGS. 1 through 5. The memory system 620, or various components thereof, may be an example of means for performing various aspects of performance monitoring for a memory system as described herein. For example, the memory system 620 may include a receive circuitry 625, a controller 630, a transmit circuitry 635, or any combination thereof. Each of these components may communicate, directly or indirectly, with one another (e.g., via one or more buses).

The receive circuitry 625 may be configured as or otherwise support a means for receiving a command for a set of memory cells in a memory system. The controller 630 may be configured as or otherwise support a means for determining a state of metadata for the set of memory cells based at least in part on the command for the set of memory cells. In some examples, the controller 630 may be configured as or otherwise support a means for setting a counter for the set of memory cells that indicates a quantity of commands received for the set of memory cells with the metadata in the state. The transmit circuitry 635 may be configured as or otherwise support a means for transmitting, to a host system, state information for the set of memory cells that is based at least in part on the quantity of commands received for the set of memory cells with the metadata in the state.

In some examples, the controller 630 may be configured as or otherwise support a means for determining a type of the command, where the counter is set based at least in part on the counter being associated with the type of the command and where the counter indicates the quantity of commands of the type received for the set of memory cells with the metadata in the state.

In some examples, the controller 630 may be configured as or otherwise support a means for determining a second state of the metadata for the set of memory cells based at least in part on a second command for the set of memory cells. In some examples, the controller 630 may be configured as or otherwise support a means for setting a second counter for the set of memory cells that indicates a second quantity of commands received for the set of memory cells with the metadata in the second state, where the state information is based at least in part on the second quantity.

In some examples, the controller 630 may be configured as or otherwise support a means for determining a second quantity of commands received for a second set of memory cells with second metadata in a second state, where the state information is based at least in part on the second quantity.

In some examples, the receive circuitry 625 may be configured as or otherwise support a means for receiving a second command for the second set of memory cells. In some examples, the controller 630 may be configured as or otherwise support a means for setting, based at least in part on the second command, a second counter for the second set of memory cells that indicates the second quantity, where the second quantity is determined based at least in part on setting the second counter.

In some examples, the counter is included in a set of counters, and the controller 630 may be configured as or otherwise support a means for configuring the set of counters for the set of memory cells, where each counter of the set of counters is associated with a respective state of the metadata for the set of memory cells and indicates a respective quantity of commands received for the set of memory cells with the metadata in the respective state. In some examples, the counter is included in a set of counters, and the controller 630 may be configured as or otherwise support a means for determining the state information based at least in part on the set of counters.

In some examples, the controller 630 may be configured as or otherwise support a means for determining a latency for an operation associated with the command based at least in part on the state of the metadata for the set of memory cells. In some examples, the transmit circuitry 635 may be configured as or otherwise support a means for transmitting latency information associated with the operation based at least in part on the latency for the operation.

In some examples, the controller 630 may be configured as or otherwise support a means for determining, based at least in part on the counter, that the quantity of commands received for the set of memory cells with the metadata in the state is greater than a second quantity of command received for the set of memory cells with the metadata in a second state, where the latency for the operation is determined based at least in part on the quantity of commands being greater than the second quantity of commands.

In some examples, the receive circuitry 625 may be configured as or otherwise support a means for receiving, from the host system, a request for the state information, where the state information is transmitted based at least in part on receiving the request.

In some examples, the controller 630 may be configured as or otherwise support a means for starting, at a memory system, a timer for a command to initiate an operation at a device coupled with the memory system. In some examples, the receive circuitry 625 may be configured as or otherwise support a means for receiving, from the device, an indication that the operation has been performed by the device. In some examples, the controller 630 may be configured as or otherwise support a means for determining a latency for the operation based at least in part on starting the timer and based at least in part on the indication that the operation has been performed. In some examples, the transmit circuitry 635 may be configured as or otherwise support a means for transmitting latency information associated with the operation based at least in part on the latency for the operation.

In some examples, the device includes a memory device, and the receive circuitry 625 may be configured as or otherwise support a means for receiving the command from a host system, where the timer is started based at least in part on receiving the command and where the latency information is transmitted to the host system.

In some examples, the device includes a host system, and the transmit circuitry 635 may be configured as or otherwise support a means for transmitting the command to the host system, where the timer is started based at least in part on transmitting the command and where the latency information is transmitted to the host system.

In some examples, the controller 630 may be configured as or otherwise support a means for determining a type of the command, where the timer is started based at least in part on the timer being associated with the type of the command.

In some examples, the controller 630 may be configured as or otherwise support a means for setting a counter that indicates a quantity of operations of the type for which latency has been determined, where the latency information is based at least in part on the counter.

In some examples, the controller 630 may be configured as or otherwise support a means for determining an identifier for the command, where the indication includes the identifier. In some examples, the controller 630 may be configured as or otherwise support a means for stopping the timer based at least in part on the indication including the identifier.

In some examples, the command is of a type, and the controller 630 may be configured as or otherwise support a means for determining a second latency for a second operation associated with a second command of the type, where the latency information is based at least in part on the second latency.

In some examples, the controller 630 may be configured as or otherwise support a means for determining an average latency based at least in part on the latency for the operation and the second latency for the second operation, where the latency information indicates the average latency.

In some examples, the command is of a first type, and the controller 630 may be configured as or otherwise support a means for determining a second latency for a second operation associated with a second command of a second type, where the latency information is based at least in part on the second latency.

In some examples, the controller 630 may be configured as or otherwise support a means for determining a state of metadata for a set of memory cells associated with the operation based at least in part on the command, where the timer is associated with the state. In some examples, the transmit circuitry 635 may be configured as or otherwise support a means for transmitting state information based at least in part on the state of the metadata for the set of memory cells.

Figure 7:
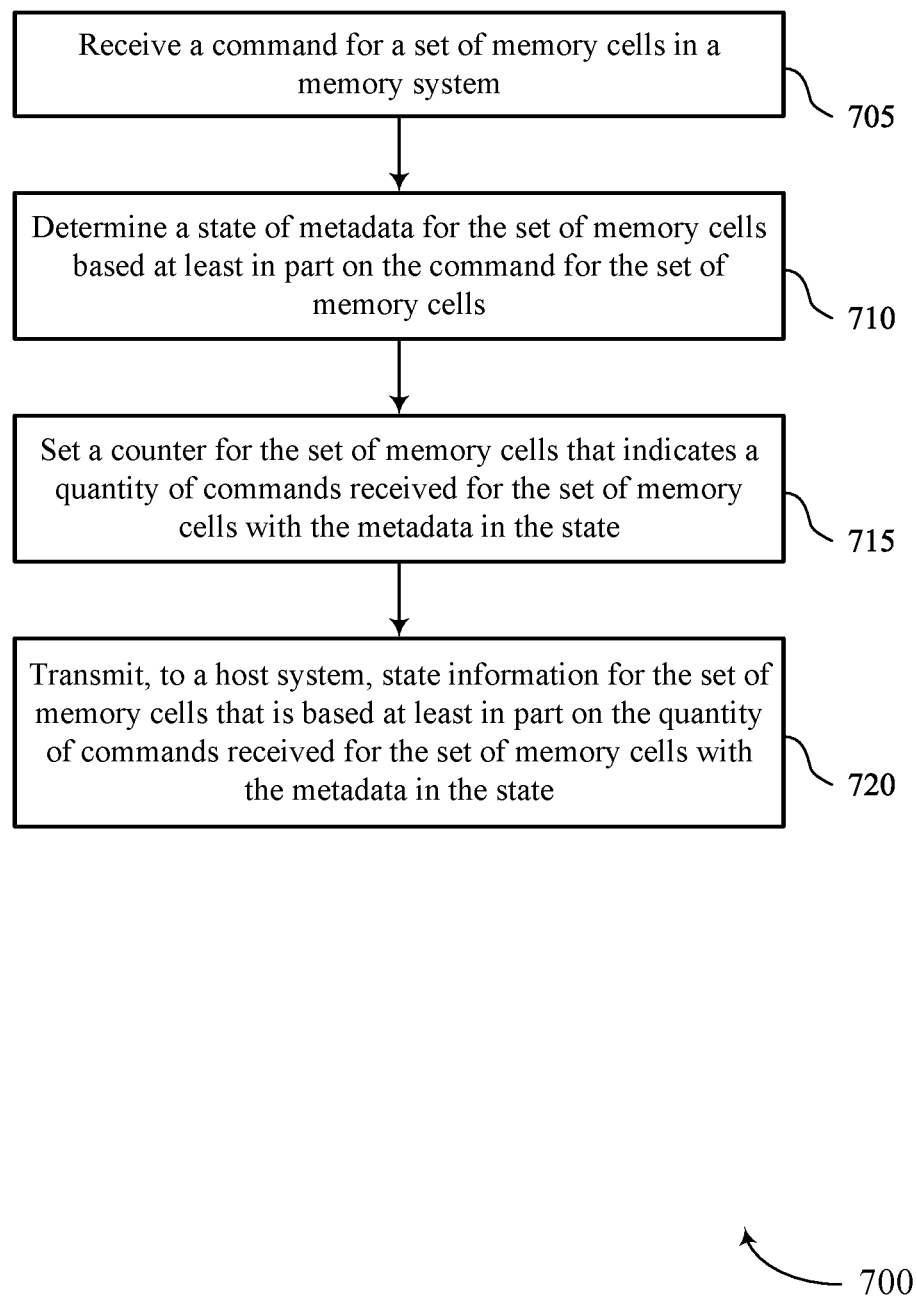
FIGS. 7 and 8 show flowcharts illustrating a method or methods that support performance monitoring for a memory system in accordance with examples as disclosed herein.

FIG. 7 shows a flowchart illustrating a method 700 that supports performance monitoring for a memory system in accordance with examples as disclosed herein. The operations of method 700 may be implemented by a memory system or its components as described herein. For example, the operations of method 700 may be performed by a memory system as described with reference to FIGS. 1 through 6. In some examples, a memory system may execute a set of instructions to control the functional elements of the device to perform the described functions. Additionally, or alternatively, the memory system may perform aspects of the described functions using special-purpose hardware.

At 705, the method may include receiving a command for a set of memory cells in a memory system. The command may be an access command (e.g., a read command, a write command) or another type of command associated with the set of memory cells (e.g. a compute command that implicates data stored in the set of memory cells). The operations of 705 may be performed in accordance with examples as disclosed herein. In some examples, aspects of the operations of 705 may be performed by a receive circuitry 625 as described with reference to FIG. 6.

At 710, the method may include determining a state of metadata for the set of memory cells based at least in part on the command for the set of memory cells. The operations of 710 may be performed in accordance with examples as disclosed herein. In some examples, aspects of the operations of 710 may be performed by a controller 630 as described with reference to FIG. 6.

At 715, the method may include setting a counter for the set of memory cells that indicates a quantity of commands received for the set of memory cells with the metadata in the state. The operations of 715 may be performed in accordance with examples as disclosed herein. In some examples, aspects of the operations of 715 may be performed by a controller 630 as described with reference to FIG. 6.

At 720, the method may include transmitting, to a host system, state information for the set of memory cells that is based at least in part on the quantity of commands received for the set of memory cells with the metadata in the state. The operations of 720 may be performed in accordance with examples as disclosed herein. In some examples, aspects of the operations of 720 may be performed by a transmit circuitry 635 as described with reference to FIG. 6.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving a command for a set of memory cells in a memory system; determining a state of metadata for the set of memory cells based at least in part on the command for the set of memory cells; setting a counter for the set of memory cells that indicates a quantity of commands received for the set of memory cells with the metadata in the state; and transmitting, to a host system, state information for the set of memory cells that is based at least in part on the quantity of commands received for the set of memory cells with the metadata in the state.

Aspect 2: The method, apparatus, or non-transitory computer-readable medium of aspect 1, further including operations, features, circuitry, logic, means, or instructions, or any combination thereof for determining a type of the command, where the counter is set based at least in part on the counter being associated with the type of the command and where the counter indicates the quantity of commands of the type received for the set of memory cells with the metadata in the state.

Aspect 3: The method, apparatus, or non-transitory computer-readable medium of any of aspects 1 through 2, further including operations, features, circuitry, logic, means, or instructions, or any combination thereof for determining a second state of the metadata for the set of memory cells based at least in part on a second command for the set of memory cells and setting a second counter for the set of memory cells that indicates a second quantity of commands received for the set of memory cells with the metadata in the second state, where the state information is based at least in part on the second quantity.

Aspect 4: The method, apparatus, or non-transitory computer-readable medium of any of aspects 1 through 3, further including operations, features, circuitry, logic, means, or instructions, or any combination thereof for determining a second quantity of commands received for a second set of memory cells with second metadata in a second state, where the state information is based at least in part on the second quantity.

Aspect 5: The method, apparatus, or non-transitory computer-readable medium of aspect 4, further including operations, features, circuitry, logic, means, or instructions, or any combination thereof for receiving a second command for the second set of memory cells and setting, based at least in part on the second command, a second counter for the second set of memory cells that indicates the second quantity, where the second quantity is determined based at least in part on setting the second counter.

Aspect 6: The method, apparatus, or non-transitory computer-readable medium of any of aspects 1 through 5 where the counter is included in a set of counters and the method, apparatuses, and non-transitory computer-readable medium, further includes operations, features, circuitry, logic, means, or instructions, or any combination thereof for configuring the set of counters for the set of memory cells, where each counter of the set of counters is associated with a respective state of the metadata for the set of memory cells and indicates a respective quantity of commands received for the set of memory cells with the metadata in the respective state and determining the state information based at least in part on the set of counters.

Aspect 7: The method, apparatus, or non-transitory computer-readable medium of any of aspects 1 through 6, further including operations, features, circuitry, logic, means, or instructions, or any combination thereof for determining a latency for an operation associated with the command based at least in part on the state of the metadata for the set of memory cells and transmitting latency information associated with the operation based at least in part on the latency for the operation.

Aspect 8: The method, apparatus, or non-transitory computer-readable medium of aspect 7, further including operations, features, circuitry, logic, means, or instructions, or any combination thereof for determining, based at least in part on the counter, that the quantity of commands received for the set of memory cells with the metadata in the state is greater than a second quantity of command received for the set of memory cells with the metadata in a second state, where the latency for the operation is determined based at least in part on the quantity of commands being greater than the second quantity of commands.

Aspect 9: The method, apparatus, or non-transitory computer-readable medium of any of aspects 1 through 8, further including operations, features, circuitry, logic, means, or instructions, or any combination thereof for receiving, from the host system, a request for the state information, where the state information is transmitted based at least in part on receiving the request.

Figure 8:
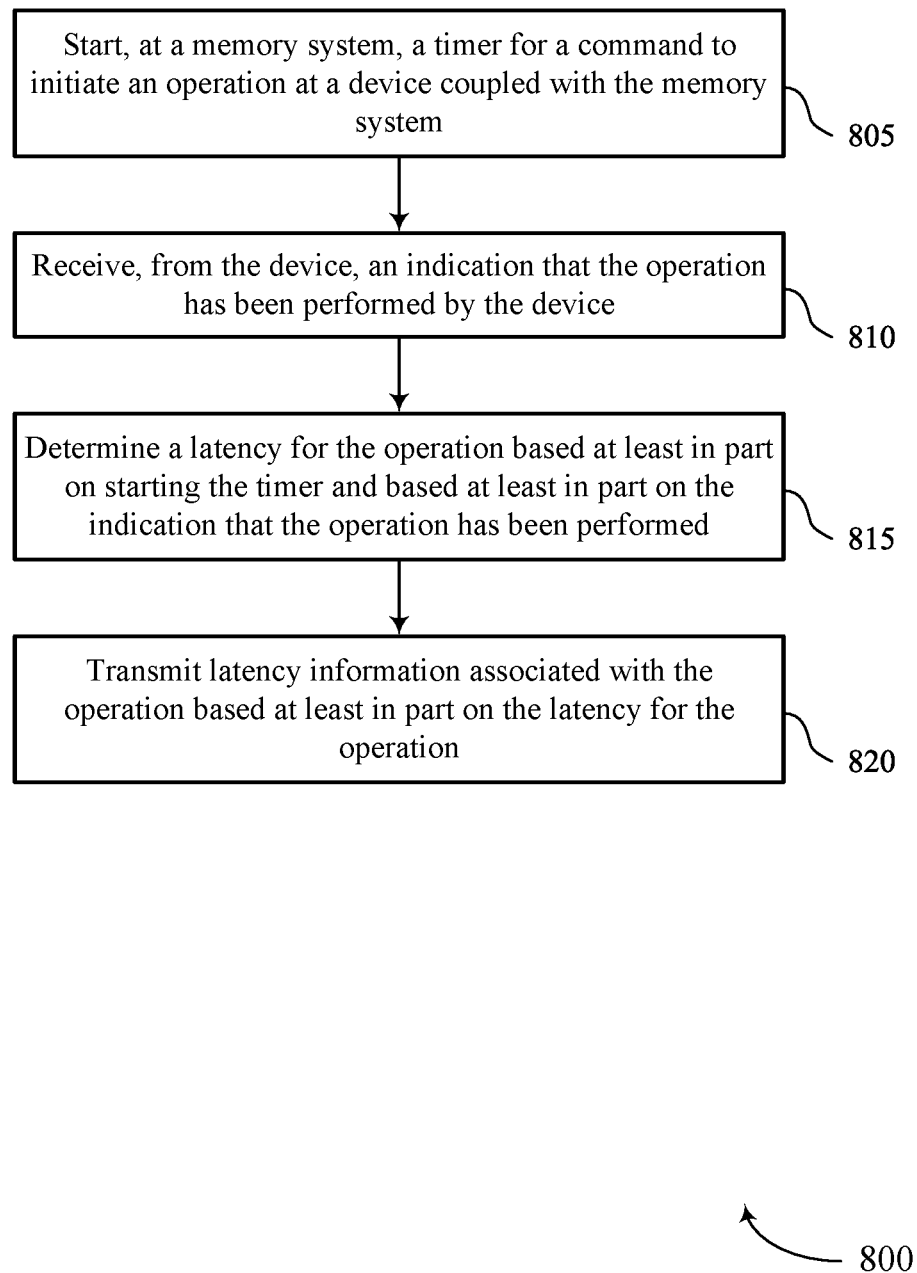

FIG. 8 shows a flowchart illustrating a method 800 that supports performance monitoring for a memory system in accordance with examples as disclosed herein. The operations of method 800 may be implemented by a memory system or its components as described herein. For example, the operations of method 800 may be performed by a memory system as described with reference to FIGS. 1 through 6. In some examples, a memory system may execute a set of instructions to control the functional elements of the device to perform the described functions. Additionally, or alternatively, the memory system may perform aspects of the described functions using special-purpose hardware.

At 805, the method may include starting, at a memory system, a timer for a command to initiate an operation at a device coupled with the memory system. The operations of 805 may be performed in accordance with examples as disclosed herein. In some examples, aspects of the operations of 805 may be performed by a controller 630 as described with reference to FIG. 6.

At 810, the method may include receiving, from the device, an indication that the operation has been performed by the device. The operations of 810 may be performed in accordance with examples as disclosed herein. In some examples, aspects of the operations of 810 may be performed by a receive circuitry 625 as described with reference to FIG. 6.

At 815, the method may include determining a latency for the operation based at least in part on starting the timer and based at least in part on the indication that the operation has been performed. The operations of 815 may be performed in accordance with examples as disclosed herein. In some examples, aspects of the operations of 815 may be performed by a controller 630 as described with reference to FIG. 6.

At 820, the method may include transmitting latency information associated with the operation based at least in part on the latency for the operation. The operations of 820 may be performed in accordance with examples as disclosed herein. In some examples, aspects of the operations of 820 may be performed by a transmit circuitry 635 as described with reference to FIG. 6.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 10: A method, apparatus, or non-transitory computer-readable medium including operations, features, circuitry, logic, means, or instructions, or any combination thereof for starting, at a memory system, a timer for a command to initiate an operation at a device coupled with the memory system; receiving, from the device, an indication that the operation has been performed by the device; determining a latency for the operation based at least in part on starting the timer and based at least in part on the indication that the operation has been performed; and transmitting latency information associated with the operation based at least in part on the latency for the operation.

Aspect 11: The method, apparatus, or non-transitory computer-readable medium of aspect 10 where the device includes a memory device and the method, apparatuses, and non-transitory computer-readable medium, further includes operations, features, circuitry, logic, means, or instructions, or any combination thereof for receiving the command from a host system, where the timer is started based at least in part on receiving the command and where the latency information is transmitted to the host system.

Aspect 12: The method, apparatus, or non-transitory computer-readable medium of any of aspects 10 through 11 where the device includes a host system and the method, apparatuses, and non-transitory computer-readable medium, further includes operations, features, circuitry, logic, means, or instructions, or any combination thereof for transmitting the command to the host system, where the timer is started based at least in part on transmitting the command and where the latency information is transmitted to the host system.

Aspect 13: The method, apparatus, or non-transitory computer-readable medium of any of aspects 10 through 12, further including operations, features, circuitry, logic, means, or instructions, or any combination thereof for determining a type of the command, where the timer is started based at least in part on the timer being associated with the type of the command.

Aspect 14: The method, apparatus, or non-transitory computer-readable medium of any of aspects 10 through 13, further including operations, features, circuitry, logic, means, or instructions, or any combination thereof for setting a counter that indicates a quantity of operations of the type for which latency has been determined, where the latency information is based at least in part on the counter.

Aspect 15: The method, apparatus, or non-transitory computer-readable medium of any of aspects 10 through 14, further including operations, features, circuitry, logic, means, or instructions, or any combination thereof for determining an identifier for the command, where the indication includes the identifier and stopping the timer based at least in part on the indication including the identifier.

Aspect 16: The method, apparatus, or non-transitory computer-readable medium of any of aspects 10 through 15 where the command is of a type and the method, apparatuses, and non-transitory computer-readable medium, further includes operations, features, circuitry, logic, means, or instructions, or any combination thereof for determining a second latency for a second operation associated with a second command of the type, where the latency information is based at least in part on the second latency.

Aspect 17: The method, apparatus, or non-transitory computer-readable medium of aspect 16, further including operations, features, circuitry, logic, means, or instructions, or any combination thereof for determining an average latency based at least in part on the latency for the operation and the second latency for the second operation, where the latency information indicates the average latency.

Aspect 18: The method, apparatus, or non-transitory computer-readable medium of any of aspects 10 through 17 where the command is of a first type and the method, apparatuses, and non-transitory computer-readable medium, further includes operations, features, circuitry, logic, means, or instructions, or any combination thereof for determining a second latency for a second operation associated with a second command of a second type, where the latency information is based at least in part on the second latency.

Aspect 19: The method, apparatus, or non-transitory computer-readable medium of any of aspects 10 through 18, further including operations, features, circuitry, logic, means, or instructions, or any combination thereof for determining a state of metadata for a set of memory cells associated with the operation based at least in part on the command, where the timer is associated with the state and transmitting state information based at least in part on the state of the metadata for the set of memory cells.

It should be noted that the methods described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 20: An apparatus, including: a memory system; and a controller coupled with the memory system and configured to cause the apparatus to: receive a command for a set of memory cells in the memory system; determine a state of metadata for the set of memory cells based at least in part on the command for the set of memory cells; set a counter for the set of memory cells that indicates a quantity of commands received for the set of memory cells with the metadata in the state; and transmit, to a host system, state information for the set of memory cells that is based at least in part on the quantity of commands received for the set of memory cells with the metadata in the state.

Aspect 21: The apparatus of aspect 20, where the controller is further configured to cause the apparatus to: determine a type of the command, where the counter is set based at least in part on the counter being associated with the type of the command and where the counter indicates the quantity of commands of the type received for the set of memory cells with the metadata in the state.

Aspect 22: The apparatus of any of aspects 20 through 21, where the controller is further configured to cause the apparatus to: determine a second state of the metadata for the set of memory cells based at least in part on a second command for the set of memory cells; and set a second counter for the set of memory cells that indicates a second quantity of commands received for the set of memory cells with the metadata in the second state, where the state information is based at least in part on the second quantity.

An apparatus is described. The following provides an overview of aspects of the apparatus as described herein:

Aspect 23: An apparatus, including: a memory system; and a controller coupled with the memory system and configured to cause the apparatus to: start, at the memory system, a timer for a command to initiate an operation at a device coupled with the memory system; receive, from the device, an indication that the operation has been performed by the device; determine a latency for the operation based at least in part on starting the timer and based at least in part on the indication that the operation has been performed; and transmit latency information associated with the operation based at least in part on the latency for the operation.

Aspect 24: The apparatus of aspect 23, where the controller is further configured to cause the apparatus to: determine a type of the command, where the timer is started based at least in part on the timer being associated with the type of the command.

Aspect 25: The apparatus of any of aspects 23 through 24, where the controller is further configured to cause the apparatus to: set a counter that indicates a quantity of operations of the type for which latency has been determined, where the latency information is based at least in part on the counter.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
  receiving a command for a set of memory cells in a memory system;
  determining, based at least in part on the command for the set of memory cells, a state of metadata bits assigned to the set of memory cells;
  modifying a value of a counter that is for the state and that is assigned to the set of memory cells based at least in part on the metadata bits assigned to the set of memory cells being the state at receipt of the command, wherein the value of the counter indicates a quantity of commands received for the set of memory cells with the metadata bits in the state; and
  transmitting, to a host system, state information for the set of memory cells that is based at least in part on the value of the counter assigned to the set of memory cells.

2. The method of claim 1, further comprising:
  determining a type of the command, wherein the value of the counter is modified based at least in part on the counter being for the type of the command, and wherein the value of the counter indicates the quantity of commands of the type received for the set of memory cells with the metadata bits in the state.

3. The method of claim 1, further comprising:
determining a second state of the metadata bits assigned to the set of memory cells based at least in part on a second command for the set of memory cells; and
modifying a value of a second counter that is for the second state and that is assigned to the set of memory cells based at least in part on metadata bits being in the second state at receipt of the second command, wherein the value of the second counter indicates a second quantity of commands received for the set of memory cells with the metadata bits in the second state, wherein the state information is based at least in part on the value of the second counter.

4. The method of claim 1, further comprising:
determining a second quantity of commands received for a second set of memory cells with second metadata bits in a second state, wherein the state information is based at least in part on the second quantity.

5. The method of claim 4, further comprising:
receiving a second command for the second set of memory cells; and
modifying, based at least in part on the second command, a value of a second counter for the second set of memory cells that indicates the second quantity, wherein the second quantity is determined based at least in part on modifying the value of the second counter.

6. The method of claim 1, wherein the counter is included in a set of counters assigned to the set of memory cells, the method further comprising:
configuring the set of counters for the set of memory cells, wherein each counter of the set of counters is associated with a respective state of the metadata bits assigned to the set of memory cells and indicates a respective quantity of commands received for the set of memory cells with the metadata bits in the respective state; and
determining the state information based at least in part on the set of counters.

7. The method of claim 1, further comprising:
determining a latency for an operation associated with the command based at least in part on the state of the metadata bits assigned to the set of memory cells; and
transmitting latency information associated with the operation based at least in part on the latency for the operation.

8. The method of claim 7, further comprising:
determining, based at least in part on the counter, that the quantity of commands received for the set of memory cells with the metadata bits in the state is greater than a second quantity of command received for the set of memory cells with the metadata bits in a second state, wherein the latency for the operation is determined based at least in part on the quantity of commands being greater than the second quantity of commands.

9. The method of claim 1, further comprising:
receiving, from the host system, a request for the state information, wherein the state information is transmitted based at least in part on receiving the request.

10. A method, comprising:
starting, at a memory system, a timer for a command to initiate an operation at a device coupled with the memory system based at least in part on the timer being assigned to a type of the operation;
stopping the timer assigned to the type of the operation based at least in part on receiving, from the device, a message that:
comprises an identifier for the command, and indicates the operation has been performed by the device;
determining a latency for the operation based at least in part on starting and stopping the timer; and
transmitting, to a host system after determining the latency for the operation, latency information for the type of the operation, wherein the latency information is based at least in part on the latency for the operation.

11. The method of claim 10, wherein the device comprises a memory device, the method further comprising:
receiving the command from the host system, wherein the timer is started based at least in part on receiving the command.

12. The method of claim 10, further comprising:
modifying a value of a counter that indicates a quantity of operations of the type for which latency has been determined, wherein the latency information is based at least in part on the value of the counter.

13. The method of claim 10, wherein the command is of a type, the method further comprising:
determining a second latency for a second operation associated with a second command of the type, wherein the latency information is based at least in part on the second latency.

14. The method of claim 13, further comprising:
determining an average latency based at least in part on the latency for the operation and the second latency for the second operation, wherein the latency information indicates the average latency.

15. The method of claim 10, wherein the command is of a first type, the method further comprising:
determining a second latency for a second operation associated with a second command of a second type, wherein the latency information is based at least in part on the second latency.

16. The method of claim 10, further comprising:
determining a state of metadata bits assigned to a set of memory cells targeted for the operation based at least in part on the command, wherein the timer is assigned to the state; and
transmitting state information based at least in part on the state of the metadata bits assigned to the set of memory cells.

17. An apparatus, comprising:
a memory system; and
one or more controllers coupled with the memory system and configured to cause the apparatus to:
receive a command for a set of memory cells in the memory system;
determine, based at least in part on the command for the set of memory cells, a state of metadata bits assigned to the set of memory cells;
modify a value of a counter that is for the state and that is assigned to the set of memory cells based at least in part on the metadata bits assigned to the set of memory cells being in the state at receipt of the command, wherein the value of the counter indicates a quantity of commands received for the set of memory cells with the metadata bits in the state; and
transmit, to a host system, state information for the set of memory cells that is based at least in part on the value of the counter assigned to the set of memory cells.

18. The apparatus of claim 17, wherein the one or more controllers is further configured to cause the apparatus to:
determine a type of the command, wherein the value of the counter is modified based at least in part on the counter being for the type of the command, and wherein the value of the counter indicates the quantity of commands of the type received for the set of memory cells with the metadata bits in the state.

19. The apparatus of claim 17, wherein the one or more controllers is further configured to cause the apparatus to:
determine a second state of the metadata bits assigned to the set of memory cells based at least in part on a second command for the set of memory cells; and
modify a value of a second counter that is for the second state and that is assigned to the set of memory cells based at least in part on metadata bits being in the second state at receipt of the second command, wherein the value of the second counter indicates a second quantity of commands received for the set of memory cells with the metadata bits in the second state, wherein the state information is based at least in part on the value of the second counter.

20. An apparatus, comprising:
a memory system; and
one or more controllers coupled with the memory system and configured to cause the apparatus to:
start, at the memory system, a timer for a command to initiate an operation at a device coupled with the memory system based at least in part on the timer being assigned to a type of the operation;
stop the timer associated with the type of the operation based at least in part on receiving, from the device, a message that:
comprises an identifier for the command, and
indicates the operation has been performed by the device;
determine a latency for the operation based at least in part on starting and stopping the timer; and
transmit, to a host system after determining the latency for the operation, latency information for the type of the operation, wherein the latency information is based at least in part on the latency for the operation.

21. The apparatus of claim 20, wherein the one or more controllers is further configured to cause the apparatus to:
modify a value of a counter that indicates a quantity of operations of the type for which latency has been determined, wherein the latency information is based at least in part on the value of the counter.

* * * * *